June 17, 1924.                            1,498,264
E. DANNER
CHAIN FASTENER
Filed Nov. 19, 1923
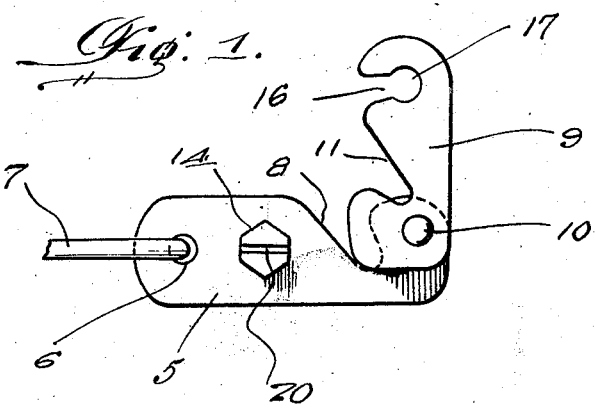
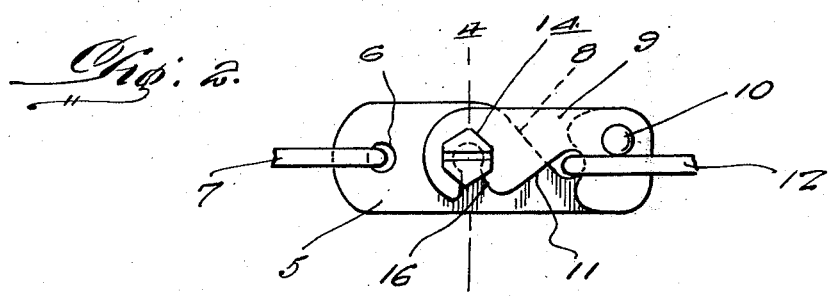
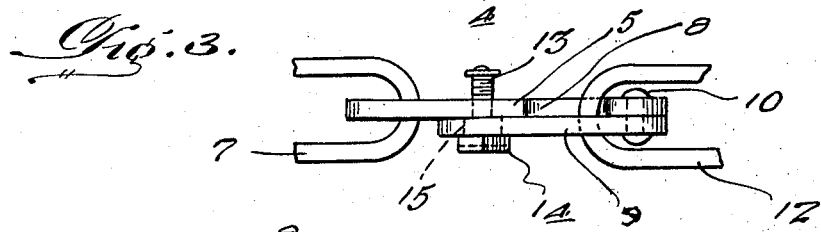
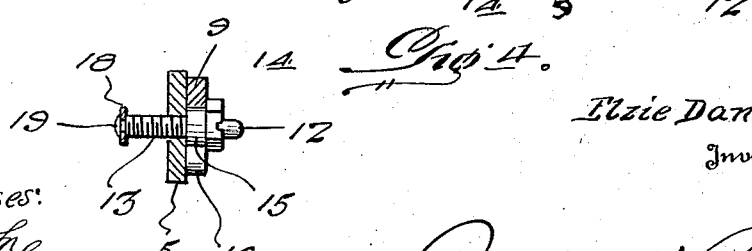

Patented June 17, 1924.

1,498,264

UNITED STATES PATENT OFFICE.

ELZIE DANNER, OF ASTORIA, ILLINOIS.

CHAIN FASTENER.

Application filed November 19, 1923. Serial No. 675,670.

*To all whom it may concern:*

Be it known that I, ELZIE DANNER, a citizen of the United States, residing at Astoria, in the county of Fulton and State of Illinois, have invented certain new and useful Improvements in Chain Fasteners, of which the following is a specification.

This invention relates to certain new and useful improvements in chain fasteners, especially adapted for connecting the ends of anti-skid chains used upon the wheels of motor vehicles.

The primary object of the invention is to provide a chain fastener of the above kind, which is extremely simple and durable in construction and efficient in operation.

A specific object is to provide a chain fastener with simple and efficient means which is manually operable to positively lock the pivoted members of the fastener in closed relation whereby accidental disengagement of the fastener from the chain is prevented, but whereby such disengagement may be readily manually effected.

Another object is to provide a positive locking means of the above character in a chain fastener wherein the tension of the chain primarily moves the pivoted members of the fastener to and tends to maintain them in closed relation.

With the above general objects in view, and others that will become apparent as the nature of the invention is better understood, the same consists in the novel form, combination, and arrangement of parts hereinafter more fully described, shown in the accompanying drawing and claimed.

In the drawing, wherein like reference characters indicate corresponding parts throughout the several views:

Figure 1 is a side elevational view of a chain fastener constructed in accordance with the present invention, and with the pusher plate of the fastener in open position.

Figure 2 is a view similar to Figure 1 with the closure plate in closed position and with the fastener engaged with the free end links of the chain.

Figure 3 is a top plan view of the device shown in Figure 2, and

Figure 4 is a transverse sectional view taken upon the line 4—4 of Figure 2.

Referring more in detail to the drawing, the present invention embodies an elongated hook plate 5 that is provided at one end with a transverse opening 6 midway between the side edges thereof for pivotal engagement with the end link 7 at one end of the chain to be connected, said hook plate 5 being provided adjacent its other end with an oblique hooked slot 8 that extends inwardly from one side edge of the hook plate 5 toward the free or hooked end of the latter and transversely past the longitudinal axis of the plate 5.

The device further embodies an elongated closure plate 9 that has a hooked end that is pivoted to the hooked end of the hook plate 5 at one side of the longitudinal axes of the members 5 and 9, by means of a rivet 10 or the like, the side to which the pivot 10 is nearest being that through which the slot 8 of the hook plate 5 opens. The hooked end of the closure plate 9 is formed by means of an oblique hooked slot 11 provided in one side of the closure plate 9 and extending from such side outwardly toward the pivot 10 and past the longitudinal axis of the closure plate 9. As viewed with relation to the movement of the plates 5 and 9 toward each other, the side edges of said members 5 and 9 through which the slots 8 and 11 open may be termed the inner side edges thereof, and will be referred to as such in further description and in the claims.

The hooked ends of the plates 5 and 9 are similar, and they are so connected that portions of each plate cover the sides of the entrance portion of the hooked slot of the other plate whereby the inner portions of said hooked slot cooperate to form a closed opening for receiving the other end link 12 when the closure plate 9 is closed, as shown in Figure 2, which opening is in line with the opening 6 and to one side of or inwardly of the pivot pin whereby the link 12 when placed under tension will exert a pull upon the hooked end of the closure plate 9 and move said closure plate to and maintain the same in closed position.

While the closure plate 9 will be effectively maintained closed as long as the chain is under tension, the same is not positive in action and is particularly ineffective when the tension upon the chain is relieved. For this purpose, I provide means for positively locking the closure plate in closed position to supplement the action of the chain tension for this purpose. This positive locking means embodies a bolt, the outer or major portion of the stem of which is threaded as indicated at 13, and the remaining smaller and inner portion of which adjacent the head 14 of the bolt is enlarged as indicated at 15 and preferably of circular form. The hook plate 5 is provided with a central transverse threaded opening through which the threaded portion 13 of the bolt stem is threaded so that the enlarged portion 15 of said stem is positioned at the same side of the hook plate 5 as that at which the closure plate 9 is positioned. The closure plate 9 is shorter than the plate 5 and is provided at its inner free ends with a transverse slot 16 that extends inwardly from the inner side edge of said closure members 9 in position to receive the stem of the bolt when the closure plate 9 is closed, the entrance portion of the slot 16 being of a width substantially equal to the diameter of the threaded portion 13 of the bolt stem, and the inner end portion of said slot 16 being enlarged as indicated at 17 to a width and form similar to the diameter and form of the enlarged portion 15 of the bolt stem. The extreme free end portion of the stem 13 is reduced for reception of a washer 18 that is held in place by riveting as at 19 and that is of a diameter greater than the diameter of the transverse threaded opening in the hooked plate 5 in which the threaded stem portion 13 is engaged. The riveting at 19 may be effected by swaging the end of the reduced portion of the stem of the bolt upon which the washer 18 is positioned, and said washer thereby effectively forms a means for preventing removal of the bolt from the hook plate 5, so that maintenance of all of the parts of the chain fastener in their proper relation under all conditions is effected. In other words, the washer 18 prevents removal of the bolt so that the same will not become lost, while the pivot 10 maintains the plates 5 and 9 in their proper connection. In order to permit ready manual rotation of the screw 13, the head 14 of the latter is preferably of polygonal form as shown, and also provided with a transverse screw driver kerf or slot 20. Thus, the screw may be rotated by the use of a pair of pliers, a wrench, or a screw driver.

Assuming that the chain fastener is in its open position shown in Figure 1, the operation of the device is substantially as follows:

The free end link 12 of the chain is engaged in the slot 11 of the closure plate 9, after which the latter is manually swung toward the hook plate 5 to the closed position shown in Figure 2, whereby the link 12 is caused to ride into the slot 8 of the closure plate 5. It is to be understood that the bolt has been previously threaded outwardly so as to bring the enlarged stem portion 15 of said bolt outwardly out of the path of the closure plate 9, and to bring the threaded adjacent portion of the bolt stem in line with the slot 16. The tension upon the link 12 will maintain the closure plate 9 in closed position as long as such tension exists, but in order to positively lock the plate 9 in closed position, the bolt is threaded inwardly so as to bring the enlarged portion 15 of its stem into the enlarged inner portion 17 of the slot 16, whereby the closure plate 9 is effectively prevented from swinging open due to the fact that the portion of the stem 15 is of greater diameter than the width of the outer portion of the slot 16, and is positioned within the enlarged portion 17 of said slot.

From the above description, it is believed that the construction and operation, as well as the advantages of the invention will be readily understood and appreciated by those skilled in the art.

Minor changes may be made without departing from the spirit and scope of the invention as claimed.

What I claim as new is:

A chain fastener comprising a slotted body plate, a screw threaded transversely through said plate, a washer fixed to the end portion of the screw, said screw having at the inner end of its threaded portion a diametrically enlarged cylindrical shoulder, the screw having at the outer end of the shoulder a head which is greater in diameter than the shoulder, a slotted hook plate pivotally connected with the body plate and having at its free end portion a slot leading in from the side edge thereof, said slot being of sufficient transverse breadth to receive the threaded portion of the screw, the diameter of the shoulder portion of the screw being greater than the transverse breadth of said slot, the slot being provided at its inner end with an enlargement, said enlargment being arcuate and being greater than a semi-circle and less than a complete circle, said enlargement being of sufficient diameter to snugly receive the enlarged cylindrical shoulder portion of the screw.

In testimony whereof I affix my signature.

ELZIE DANNER.